Patented Apr. 3, 1951

2,547,380

UNITED STATES PATENT OFFICE 2,547,380

CATALYST FOR HYDROCARBON CONVERSION

Raymond N. Fleck, Los Angeles, Calif., assignor to Union Oil Company of California, Los Angeles, Calif., a corporation of California No Drawing. Application October 1, 1945, Serial No. 619,693

22 Claims. (Cl. 196—52)

This invention relates to catalysts and catalytic processes for processing various hydrocarbons and hydrocarbon mixtures. More particularly the invention relates to new and improved catalysts to be employed in these hydrocarbon conversion processes and further to the methods of preparing these catalysts.

The treatment of various hydrocarbons with catalysts to produce changes therein is well known in the art. The particular catalysts employed, temperatures and pressures of operation and other related factors serve to determine particular reactions taking place in the hydrocarbon feed. Many of these processes utilize a solid catalyst of granular, pelleted, powdered or other form, and for this reason these processes are termed "heterogeneous catalytic conversion processes." Included in this group for example, are catalytic cracking, dehydrogenation, hydrogenation, desulfurization, hydroforming, aromatization, certain alkylation and isomerization processes, addition reactions and the like. For these processes many catalysts have been employed with varying success. In most cases, although such is not always the case, these catalysts comprise a catalytic agent distended on a suitable carrier or support. Such catalytic agents have included the oxides or other compounds of the metals such as chromium, molybdenum, cobalt, nickel, zinc, lead, cadmium, vanadium, manganese, tantalum, tungsten, titanium, platinum, columbium, scandium, thorium, uranium, zirconium, tin, copper, etc., which compounds may be produced by an appropriate treatment of the chromates, molybdates, vanadates, sulfates, nitrates, chlorides and other suitable salts of the metals by methods well known in the art. Many of these catalytic agents are effective only when supported on such carriers as alumina, magnesia, magnesium hydroxide, silica, zirconia, titania, zinc oxide, thoria, or a combination of one or more of these. Certain of these processes, however, may employ a catalyst comprising predominantly a catalytic agent in the absence of a carrier or supporting material. Thus, for example, a desulfurization process may be effected in the presence of a catalyst comprising the combined oxides of cobalt and molybdenum, i. e. cobalt molybdate, in powdered, pelleted or granular form in the absence of the alumina-silica carrier. However, catalysts supported on such a carrier are generally found to be equally and in many instances more effective than those catalysts consisting entirely of the catalytic agent and at the same time are considerably less expensive.

Many methods of preparation of these heterogeneous catalysts have been utilized including impregnation, coprecipitation, mechanical mixing, sublimation and the like. In preparing such a catalyst by impregnation the carrier in the form of powder, granules or pellets is immersed in a solution of a suitable soluble salt of a desired metal such as ammonium molybdate, chromium nitrate, ammonium dichromate, ammonium vanadate, ammonium tungstate, cobalt nitrate, and the like, whereupon the carrier having adsorbed a portion of the solution is dried and calcined at a temperature in the range of about 400° C. to about 700° C. to convert the adsorbed salt to the oxide of the metal or metals employed. In preparing a catalyst by coprecipitation the process embodies a simultaneous precipitation of the hydrated oxide of the carrier and the hydrated oxide or oxides of the desired catalytic agents from a solution containing appropriate amounts of suitable soluble salts of the carrier type material and the metal or metals employed as catalytic agent. A modification of this procedure consists of precipitating the hydrous oxides of the catalytic agents in the presence of a wet carrier gel.

There are certain factors which need be critically examined when selecting the catalyst to be employed in any of the hydrocarbon conversion processes including, the expense of the catalyst; the relative activity of the particular catalyst in comparison to others which may be employed; the mechanical strength of the catalyst particles or granules and the effective life of the catalyst at the conditions of temperature and pressure employed in the operation. Each of these factors are interrelated and a deficiency in one may be compensated for by relative proficiency in one or more of the others. However, one of the most important of these is the life of the catalyst in operation.

The catalyst life appears to be a function of its composition and the temperatures to which it is subjected and it is toward the former of these that the present invention is primarily directed. A laboratory evaluation procedure for measuring the relative life expectancy of a catalyst has been developed and is widely used in the art. This procedure consists in subjecting samples of the catalyst in question to high temperature heat treatments for given periods of time and subsequently ascertaining the activity of the heat treated catalyst in relation to the activity of the catalyst prior to this heat treatment. Exact predication of the catalyst life on the basis of these heat treatments is as yet impossible, but it has been found that the relative life expectancy of the various catalysts may be determined by a comparison of their heat stability characteristics.

During extended usage of catalysts of the type described a gradual loss in catalyst activity occurs which is generally accompanied by other changes of a physical nature such as loss of mechanical strength, decrease in effective surface area, changes in the pore size distribution and the like. The explanation for the loss in catalytic activity and attendant changes is uncertain and in any case comparatively complex but it is apparently tied up with various operational factors such as the temperature, both of the reaction and the regeneration, cooling rates and the like. It has been found that these various changes in the catalyst can be induced by high temperature heat treatments for comparatively short periods of time. Thus one standard measure of a catalyst's expected life characteristics is obtained by heating a sample of the catalyst for a period of six hours at a temperature of 800° C. The heat treated sample and a sample of the fresh catalyst are then tested for activity in the particular reaction for which the catalyst was prepared and the loss in activity exhibited by the heat treated catalyst is compared with results of similar tests on other catalyst samples to give a picture of the relative stability of the catalyst under examination.

The exact causes for the degradation of a catalyst during continued operation or in the heat stability test as above described has not been definitely determined but it is commonly accepted that a change in the structure of the catalyst or carrier plays at least a large part in this loss of activity. For example X-ray diffraction data have shown that the loss of activity of an alumina supported catalyst is accompanied by a crystal growth within the catalyst and a resultant destruction of the gamma or more active form of alumina. However, in the absence of a catalytic agent, such an alumina carrier is stable with respect to the destruction of the gamma alumina at temperatures as high as 1,000° C. But this effect is considerably altered when a catalytic agent is distended on the same alumina and it is with this aspect of the catalyst problem that the present invention is primarily concerned. Apparently the effect of a catalytic agent on the alumina or on other carriers is to accelerate or possibly even catalyze the crystal growth, the loss in surface area and other related factors which may contribute to the loss in catalyst activity.

This effect has been shown many times over and is particularly observable in catalyst surface area studies in which I have found that alumina containing approximately 12% of distended molybdenum oxide loses substantially all of its surface area when measured by the method of Brunauer, Emmett and Teller (J. Am. Chem. Soc. 60, 309 (1938)) employing nitrogen as the adsorbate after a six hour heat treatment at 900° C. In the absence of the distended molybdenum oxide, however, the same alumina will show a surface area, measured as above, of approximately 162 square meters per gram after calcination of six hours at 1040° C. Further, it has been found that the stability of the catalyst appears to be a function not simply of the presence of molybdenum oxide or other catalytic agent but is correlative to the relative amount of molybdenum oxide or other catalytic agents on the carrier, inasmuch as the lower the percentage of the catalytic agent, the greater will be the heat stability of the catalyst. This, however, is of limited value in the present art inasmuch as it has been found that certain percentages of the catalytic agent are necessary in order to attain an economically feasible catalytic activity even at the expense of a catalyst of shorter life. It may be postulated that the active catalytic agent present on the alumina undergoes a reversible chemical reaction with the alumina, thus destroying the activity of the carrier. The present invention is based primarily on the principle of distending on the support or carrier material a form of the catalytic agent which will be incapable or at least less capable of catalyzing this destruction.

It is an object of the present invention to prepare improved hydrocarbon conversion catalysts to be employed in such processes as hydroforming, cracking, desulfurization, dehydrogenation, hydrogenation, aromatization, addition reactions, and the like, which exhibit improved heat stability properties and resultant improved catalyst life without sacrifice of the catalyst activity.

It is yet another object of my invention to make possible the use of less highly refined carriers for such catalysts as hydroforming, dehydrogenation, desulfurization, aromatization, and the like, which heretofore have required high quality synthetic carriers comparatively free of impurities upon which the appropriate catalytic agents have been distended which substitution is made possible by the improved heat stability of the catalysts containing the catalytic agents of my invention.

Another object of the invention is to provide a class of catalysts in which the catalytic agent comprises a heteropoly acid or a metal salt of a heteropoly acid.

A still further object of the present invention is to provide a method of preparing catalysts for these hydrocarbon conversion processes having improved heat stability characteristics which involves new and simplified methods of synthesizing and utilizing the heteropoly acids which heretofore have required long and tedious preparation methods. It is emphasized, however, that the hereinafter disclosed catalysts may be prepared from heteropoly acids by the methods of this invention or other methods regardless of the origin and synthesis methods of heteropoly acids themselves.

Hydrocarbon conversion processes may be divided into various narrower classifications. The term "conversion" is a broad one and connotates any change in the structure of the molecules present in the feed stocks. These changes vary depending upon the operating conditions and catalysts employed in the treatment of the stock. Thus in one class of operation the predominate reaction is hydrogen exchange, i. e. addition of hydrogen to the hydrocarbon molecules, withdrawing hydrogen therefrom or in some instances adding hydrogen to a portion of the feed at least partially at the expense of another portion of the feed. The processes which may be classed as "hydrogen exchange processes" include dehydrogentation, hydrogenation, hydroforming, aromatization and desulfurization. This latter process may be classed in this group by virtue of the fact that the removal of the sulfur from the hydrocarbon molecule is accompanied by the introduction of hydrogen to take its place. A second class of processes although classifiable in the above grouping is directed primarily to a change in relative size of the molecules. Such processes may either reduce or increase the molecular size of the components of the feed and include the processes of cracking, alkylation, polymerization, condensation, and the like and on the basis of their primary function may be termed "molecular reforming processes." A third class or "isomerization process"

is unique in itself although of course isomerization takes place to a certain extent in the majority of the other hydrocarbon conversion reactions. As such, however, it is not the primary reaction in these other processes. A fourth class of conversion process comprises the "addition reactions" such as nitration, chlorination, bromination, hydration, and the like.

Whereas, the present invention contemplates the use of the catalysts as hereinafter described in any of the hydrocarbon conversion reactions, I have found that they have particular utility in those processes involving primarily hydrogen exchange including, hydroforming, hydrogenation, dehydrogenation, desulfurization and aromatization inasmuch as in general these processes utilize catalysts comprising a catalytic agent distended on a suitable carrier. Further, either during the reaction period or the regeneration period the catalysts employed in these processes are usually subjected to comparatively high temperatures and as a consequence heat stability of the catalysts becomes a factor of major importance.

The present invention comprises the use of the heteropoly acids or the salts of the heteropoly acids as catalytic agents to be employed as such or distended on a suitable carrier material to be used in the above described catalytic processes. The structure of the heteropoly acids is difficult of determination owing to the very large size of the molecule. The heteropoly acids may be best described as complex inorganic substances of high molecular weight in which two or more different acid cations or oxides of metals or metalloids are associated with varying, frequently indeterminate amounts of combined water as water of hydration. The molecular weight of these bodies may be as great as 3,000 or higher and they are comprised essentially of nuclear cations of such metals as copper, thorium, tin, cerium, cobalt, zirconium, titanium, and the like or such nonmetals as boron, silicon, phosphorus and arsenic, surrounded by oxygen radicals of molybdenum, tungsten or vanadium. According to the work of Miolati (J. prakt. Chem. (2), 1908, 77, 417) substantiated by Illingworth and Keggin (J. Chem. Soc. 1935, 580) the typical acid atom of the heteropoly acid, that is, the phosphorus atom in phosphoheteropoly acids, the silicon atom in silico-heteropoly acids, etc., is to be regarded as a central atom of a nucleus. This central atom is hydrated and attached to six oxygen atoms, thus $H_7PO_6$, $H_8SiO_6$, etc. The oxygen is linked to the nuclear atom of phosphorus, silica, boron, arsenic or the like in the same way that molecules of ammonia are bound to the metal atom in the metallic aminos. The oxygen atoms can be wholly or partially substituted by radicals such as $MoO_4$, $Mo_2O_7$, $WO_4$, $W_2O_7$, $V_2O_5$, $V_2O_6$. Thus we may form phosphomolybdic acid, phosphotungstic acid, phosphovanadic acid and the like. The reasons for the existence of so many of these heteropoly acids are the possibilities of different central atoms, and the presence of the different acid radicals in the same molecule in varying degrees of saturation. Thus I may employ phosphomolybdotungstic acid in which molybdenum and tungsten containing radicals surround the central phosphorus atom, silicomolybdovanadic acid, titanomolybdotungstic acid and the like. In general the acids comprise the central atom surrounded by six or twelve molybdenum, tungsten, or vanadium radicals depending upon the oxidation state of the metal in the radical.

Further, I may employ the metal salts of these heteropoly acids as catalytic agents such as for example, cobalt phosphomolybdate, cadmium borotungstate, cadmium silicomolybdate, ferric silicomolybdate, ammonium vanadomolybdate, zinc phosphomolybdate, and the like.

I have found that by employing the appropriate heteropoly acid in the preparation of the catalyst of the type described hereinbefore that the active catalytic agent is so bound by the central atom of the heteropoly acid that the propensity to catalyze the destruction of the carrier during usage or heat stability tests is greatly minimized and the stability of the carrier approached that of the carrier in the absence of a catalytic agent. At the same time the presence of the central atom apparently has substantially no deleterious effect on the activity of the catalyst towards promoting the particular reaction desired, and in many cases actually enhances the activity thereof. The choice of the heteropoly acid to be employed is a function of the reaction to be catalyzed. Thus, as is well known, molybdenum oxide is an effective catalytic agent when distended on an alumina carrier for the promotion of the hydrocarbon conversion or hydrogen exchange reaction known as "hydroforming." In like manner, I have found that a heteropoly acid or acid salt in which molybdenum containing radicals predominate when distended upon an alumina carrier is an excellent catalyst for this same reaction and at the same time has a longer effective catalyst life and correlatively a greater heat stability than does the conventional molybdenum oxide on alumina hydroforming catalyst. Such catalytic agents may include for example phosphomolybdic acid, silicomolybdic acid, germanomolybdic acid, chromiomolybdic acid, zinc phosphomolybdate, aluminum phosphomolybdate, aluminum silicomolybdate, titanium phosphomolybdate and the like. Similarly the combined oxides of cobalt and molybdenum distended on a suitable support such as alumina has found application as a catalyst for the desulfurization of sulfur containing hydrocarbons and for this purpose I have found that the cobalt salt of a heteropolymolybdic acid such as cobalt phosphomolybdate, cobalt silicomolybdate, cobalt chromomolybdate, cobalt phosphomolybdovanadate, and the like, when distended on a similar carrier give a catalyst equally, if not more active and possessed of a longer effective life and greater heat stability. Other heteropoly acid catalysts may be employed for other reactions such as dehydrogenation, aromatization, cracking, hydration, polymerization, hydrogenation and the like, and in general I have found it preferable to employ a heteropoly acid or a heteropoly acid salt in which the predominant metal radical is the same as the preferable metal oxide or other compound employed as the catalytic agent in the conventional catalyst for the same type of reaction.

In general I have found that it is preferable to employ a heteropoly acid or a salt of the heteropoly acid as the catalytic agent which contains the same metal ion found to be most effective in conventional catalysts for the particular reaction to be catalyzed. In addition, however, other ions contained in the heteropoly acids or its salt appear to be beneficial in the final catalyst and by the use of these acids many groups of metal ions which are incompatible in ordinary impregnation solution may be distended on the carrier in one operation. For example such ions as beryllium aluminum, thorium and iron cannot ordinarily exist in solution with such ions as molybdate tungstate and vanadate due to the precipitation therefrom of the hydroxides, molybdates, tungstates or vanadates of these metals. However, the above metallic ions may be added to heteropoly acid solutions without formation of a precipitate because of the complex form of the molybdenum, tungsten, and vanadium ions. In this manner a soluble salt of the above metals as for example the nitrates, chlorides, sulphates or the like may be added to aqueous solutions of these heteropoly acids yielding with at least a portion of the added metal ion a metal salt of the particular heteropoly acid or acids in the solution. Further, if desired the soluble salts of these metals may be added in excess of the amount equivalent for salt formation with the heteropoly acid without formation of a precipitate. Thus for hydroforming, I have found that catalysts comprising phosphomolybdic or silicomolybdic acids distended on alumina are the most effective. For such catalysts I may employ from about 2% to about 20% of the catalytic agent and about 80% to about 98% of the carrier, but preferably the amount of catalytic agent on the carrier should be in the range of about 5% to about 15%. Although phospho- and silicomolybdic acids are the preferred acids for use in hydroforming catalysts I have also found that the titanomolybdic acid, germanomolybdic acid, and others are also effective. Further, certain of the salts of the molybdic acids such as aluminum phosphomolybdate, beryllium phosphomolybdate, titanium phosphomolybdate, zirconium phosphomolybdate, chromium phosphomolybdate as well as the corresponding salts of the silico-, titano-, germano- and stannomolybdates are also effective when employed as the catalytic agents in hydroforming catalysts. Of these salts it appears that the aluminum phospho- and silicomolybdates and the chromium phospho- and silicomolybdates are the most effective.

For aromatization or dehydrogenation catalysts I have found that best results are obtained if the chromium ion is present in the salt or in the acid either as the central ion of the heteropoly acid or as the addition ion in the metal salt of the heteropoly acid. Thus I may employ catalysts comprising such catalytic agents as chromomolybdic acid or salts thereof, chromovanadic acid, chromium phosphomolybdate, chromium silicomolybdate, chromium phosphotungstate, chromium silicotungstate, chromium phosphovanadate, beryllium chromomolybdate and the like, distended on a suitable carrier such as alumina, magnesia, thoria, titania, and the like, and of these the preferable is alumina. In these catalysts the catalytic agent may be employed in amounts ranging from about 3% to about 30% and preferably in amounts ranging from about 5% to about 15% with the complementary amount of the desired carrier.

In the desulfurization of hydrocarbons employing a solid type catalyst best results have been obtained employing the heteropoly acids or other salts of which a cobalt ion is contained such as for example, cobalt phosphomolybdate, cobalt silicomolybdate, cobalt phosphomolybdovanadate in which a portion of the molybdenum oxide in a heteropoly molybdic acid is replaced by vanadium, cobalt phosphotungstate, cobalt titanomolybdate, and the like. Although the cobalt containing agents are the preferred ones for the desulfurization process other of the heteropoly acids and salts and particularly those containing tungsten are effective catalytic agents such as for example nickel stannotungstate, stannotungstic acid, phosphotungstic acid, nickel silicotungstate, nickel borotungstate, germanotungstic acid and the like, as well as iron and nickel salts of the heteropoly molybdic acids.

Similarly in the preparation of reforming catalysts I have found that the preferred element is vanadium in such form as phosphovanadic acid, silicovanadic acid, zirconium phosphovanadate, zinc phosphovanadate, and the like. However, other catalytic agents may be employed such as stannic phosphomolybdate, zinc phosphotungstate, zirconium phosphomolybdate, chromium phosphomolybdovanadate, stannic phophotungstovanadate, and the like.

The catalysts according to the present invention containing as they do catalytically active agents in combined form possess greater heat stability and longer effective catalytic life, increased activity in many cases, lower carbon deposition when operating at relatively high temperatures and equally important the property of permitting the usage of impure carrier materials.

As pointed out above catalytic agents as normally employed have the effect of accelerating the destruction of the catalytic properties of the carrier material employed when exposed to long periods of usage or comparatively high temperatures. Further, it has been found that the presence of certain impurities in the carrier such as sodium oxide, calcium oxide, magnesium oxide and the like even in relatively small amounts such as 1% to 5% or less has the effect in the presence of the catalytic agent of still further accelerating this destruction or degradation of the carrier material. I have found that by the usage of the catalytic agents herein described comprising the heteropoly acids or the metal salts of the heteropoly acids that the effect of these impurities is also minimized possibly as a result of the combination of these impurities with the catalytic agent. It is postulated that such deleterious components in the carrier may preferentially react with the heteropoly acid or its salt to form for example such compounds as sodium phosphomolybdate, calcium phosphomolybdate, magnesium silicomolybdate and the like, depending of course upon the heteropoly acid or salt employed, and in so doing become effectively isolated from the carrier and thereby lose their property of accelerating or promoting the degradation of the carrier. Whereas, I have found that this effect is realized, the mechanism thereof as described represents only one possible explanation and is in no way intended to limit my invention in this respect.

Heteropoly acids themselves may be prepared in a number of ways. The conventional method of preparation of these acids as for example phosphomolybdic acid, or silicomolybdic acid is by the reaction, in the first case, of sodium phosphate and sodium molybdate by careful acidification and in the second by the reaction of sodium silicate and sodium molybdate upon acidification with hydrochloric acid. In either case the extraction of the aqueous solution of the resultant acid with ether results in the formation of an ether complex with the acid which separates as a distinct phase from the remainder of the solution. Removal of the ether from this separated phase leaves the corresponding heteropoly acid. These methods, however, are to a certain extent objectionable when the acids produced are to be used in the preparation of catalysts inasmuch as they are contaminated with sodium ion which are undesirable in the finished catalysts when present in excessive amounts. Normally purification of the acids prepared in this manner is accomplished by repeated recrystallization from water with attendant difficulties and reduction of product yield.

In another method of preparation of phosphomolybdic acid for example, freshly precipitated molybdenum oxide has been treated with phosphoric acid to yield the heteropoly acid free in this case from the undesirable sodium ion. I have found, however, that this procedure may be further simplified by employing sublimed molybdenum oxide which will react with phosphoric acid in the presence of water and preferably also in the presence of nitric acid. In this procedure sublimed molybdenum oxide, which is in the form as isolated from molybdenum containing ores by oxidation and sublimation is reacted directly with cheap readily available chemicals to form an active stable phosphomolybdic acid. The unreacted molybdenum oxide may of course be recycled and in this manner high yields of the heteropoly acid are obtained.

For example one batch of phosphomolybdic acid was prepared by heating almost to boiling for one-half hour a mixture of 28 parts of sublimed molybdenum oxide, 6 parts of 85% phosphoric acid, 2 parts of concentrated nitric acid and 200 parts of water. A clear solution resulted which was decanted from the unreacted molybdenum oxide which upon extraction with ether yielded approximately 15 parts of the ether acid complex which contained approximately 8 parts of the acid. It is apparent that this method of preparation is simpler and results in a purer and less expensive product than the methods heretofore employed.

The recommended procedure for the purification of these acids and particularly those in which sodium ion is contained as a contaminate involves the isolation of the acid and recrystallization from water. I have found that a simpler and more economical purification is obtained by merely washing the ether extract with dilute nitric acid two to three times. The washed complex may then be diluted with water and the ether removed by distillation, airblowing, or the like, to leave an aqueous acid concentrate free of contaminating ions such as sodium or chloride ions, which may be diluted and used to impregnate the catalysts as hereinafter described without further purification. Although the ether extraction of the acid is not always necessary in order to prepare the desired catalysts, I have found that should the extraction be desirable other oxygen, nitrogen or sulfur compounds which form complexes with the heteropoly acids may be used for the extraction such as for example diisopropyl ether, diethyl sulfide, pyridine, other organic amines and the like. Whereas, the above discussion pertaining to the preparation of the heteropoly acids has centered primarily around the phospho- and silicomolybdic acids, such emphasis is not intended to be indicative of any limitations of my invention but was merely used for descriptive purposes inasmuch as other heteropoly acids such as silicotungstic acid, germanovanadic acid and in general any of the earlier described heteropoly acids may be prepared by the method or methods described. Still further, I do not wish to be limited to the preparation of any of these heteropoly acids by the methods disclosed, inasmuch as they may be prepared in any manner desired to be employed in the catalysts according to my invention. However, as far as I am aware the method of preparation of the phosphomolybdic acid, employing sublimed rather than freshly precipitated yellow molybdenum oxide is new in the art and as such constitutes a portion of the present invention.

As described above the synthesis of silicomolybdic acid or other silico-heteropoly acids by conventional means involves the acidification with hydrochloric acid of a partially acidified solution of sodium molybdate and sodium silicate. Both sodium and chloride ions present in excessive amounts are deleterious to any catalysts and as a consequence salts having ammonium or nitrate ions are employed in their place wherever possible in catalyst preparations. However, ammonium salts cannot be used for the preparation of silicomolybdic acid since ammonium silicate is non-existent and ammonium silicomolybdate is insoluble. The preparation of a low sodium silicomolybdic acid catalyst involves, therefore, an incomplete and comparatively costly ether extraction to separate the silicomolybdic acid from the contaminating ions. To circumvent this difficulty I may prepare the silicomolybdic acid from sodium molybdate and sodium silicate as above, employing nitric acid in place of hydrochloric acid. The resultant solution is subsequently diluted and passed through an ion exchange to remove the sodium ions. The ion exchanged solution, contains only nitric acid, silicomolybdic acid and possibly small amounts of silica and molybdenum trioxide gels, and is satisfactory as such or upon dilution or concentration to impregnate carriers directly or to be employed in the preparation of the metal salts of silicomolybdic acid, solutions of which may subsequently be employed to impregnate the desired carrier.

If it is desired to employ as the catalytic agent a salt of a heteropoly acid rather than the acid itself, this salt may be readily prepared by simple reaction of the acid with a soluble salt of the metal ion desired. Thus for example cobalt phosphomolybdate may be readily prepared by simple mixing of a soluble cobalt salt such as cobalt nitrate, cobaltous fluoride, cobalt iodide, cobalt bromide, or the like, with the aqueous phosphomolybdic acid. Alternatively the salts may be prepared by direct synthesis without the intermediate step of acid preparation. Thus cobalt carbonate, phosphoric acid and sublimed molybdenum trioxide may be reacted and the reaction products extracted with alcohol, ether, or the like to obtain directly the cobalt phosphomolybdate complex from which the salt is easily isolated. Further freshly precipitated cobalt phosphate may be reacted with freshly precipitated molybdenum and extracted with alcohol to again obtain cobalt phosphomolybdate complex. Probably the preferred method of preparing these salts and particularly the salts of the phosphomolybdic acid involves the reaction as previously described of sublimed molybdenum trioxide with an excess of phosphoric acid in the presence of a small amount of nitric acid to yield the phosphomolybdic acid which is contaminated with unreacted phosphoric acid and to this mixture the desired metal ion such as aluminum, zinc, cobalt, nickel, chromium, iron or the like is added to yield corresponding metal phosphomolybdate plus a precipitate of the corresponding metal phosphate. Such a procedure has considerable merit in that by simple control of the amounts of the metal ions added the reaction can be employed to remove excess phosphoric acid for the purification of the heteropoly acid or alternatively for the preparation and simultaneous purification of the corresponding metal salt. Thus in the preparation of the phosphomolybdic acid as described an excess of phosphoric acid is employed to accelerate the reaction between the molybdenum trioxide and the phosphoric acid. In certain cases the presence of the excess phosphate ion is undesirable in the preparation of the finished catalyst and to eliminate this certain purification procedures have been described such as extraction of the acid with ether or other organic compounds capable of forming complexes therewith, by formation of insoluble salts with the heteropoly acid or the like. Another method of purification is apparent therefore in the above reaction whereby a sufficient quantity of a soluble salt, such as the nitrate, of a metal such as aluminum, zinc, iron or the like is added to form an insoluble precipitate of the metal phosphate from which the acid may be readily separated and employed in catalyst preparations substantially free from the contaminating phosphoric acid. Similarly if it is desired to form the metal salt of the heteropoly acid an excess of the soluble metal salt may be added whereby the phosphoric acid is removed by precipitation of the phosphate and the excess salt will react with the heteropoly acid to form a soluble metal salt therewith which is substantially free of undesirable phosphate ions.

Numerous methods may be employed for the preparation of the finished catalysts from these acids or from the salts of the acids, the choice of which will depend upon the available facilities and methods used in preparing the catalytic agent and other related factors. The catalysts, according to the present invention, consist predominantly of a carrier upon which is distended in one manner or another one or more heteropoly acids as described, or one or more metal salts of these heteropoly acids or a mixture of metal salts and heteropoly acids. As carriers for these catalysts I may employ such materials as alumina, zirconia, silica, titania, magnesia, zinc oxide, thoria, or the like, and as pointed out above in general I prefer to employ the heteropoly acid or a salt of a heteropoly acid as the catalytic agent which contains the metal ion which has been found to be most suitable in conventional catalysts. The amount of the catalytic agent distended on the carrier in each case will, of necessity, be a function of the agent to be employed, the type of carrier employed, and the reaction to be catalyzed. Generally, however, it has been observed that these heteropoly acids or salts are for a given per cent composition of the catalyst more effective than an equivalent amount of a catalytic agent comprising a metal oxide and as a result I may employ these catalytic agents in smaller proportions to the carrier than the catalytic agents presently employed. Thus, whereas, the preferred range of molybdenum trioxide in a hydroforming catalyst is in the region of 8% to 12%, a catalyst of equivalent activity may be prepared from a heteropoly acid or salt thereof containing molybdenum comprising from about 6% to about 10% of the catalytic agent. This appears to be true in other types of catalysts such as dehydrogenation catalysts containing vanadium and the desulfurization catalysts containing cobalt and molybdenum. I prefer to employ as carriers for all of these reactions an alumina of either highly refined nature or of less refined nature such as bauxite. In this respect the usage of the catalytic agents herein disclosed permits the use of the considerably less expensive bauxite in place of the highly refined aluminas which have been thought to be essential for such reactions as hydroforming, dehydrogenation, desulfurization, and the like.

The methods of preparing each of these catalysts may be divided into four classes of procedure involving impregnation, mechanical mixing, the formation of the active catalytic agent in situ by the decomposition of an organic complex thereof or the formation of the active catalytic agent in situ by the decomposition of an inorganic complex thereof.

In the preparation of a catalyst by impregnation two alternative courses of procedure may be followed. One involves the isolation and purification of the desired heteropoly acid or salt and subsequent immersion of the carrier in a water solution of the catalytic agent followed by calcination to give the final catalyst. In the alternative method the carrier may be impregnated directly with the unpurified acid or salt during any stage of the preparation of the catalytic agent. Thus if the ether complex is obtained the carrier may be impregnated directly with this complex as such preferably diluted with additional quantities of ether. However, if the preparational procedures, according to this invention are followed the carrier may be impregnated directly with the reaction product thus eliminating the steps of ether extraction and purification. This latter method of impregnation is particularly applicable in those cases where the heteropoly acid or the salt of the heteropoly acid is formed in the absence of contaminating ions as for example as illustrated in the preparation of the phosphomolybdic acid directly from the phosphoric acid and molybdenum trioxide in the presence of nitric acid. In this case the liquid product may be removed from the undissolved molybdenum trioxide and the catalyst carrier, in any desired form such as pellets, powder, granules or the like may be immersed directly in the liquid product inasmuch as I have found that the presence of the nitric acid and unreacted phosphoric acid have no detrimental effect on the final catalyst in most cases. For this reason, generally I prefer to use those heteropoly acids or salts in which phosphorous is the central ion of the compound inasmuch as such acids or salts may be so readily prepared in the absence of contaminating ions and as a result catalyst preparation is greatly cheapened. However, it is to be understood that I do not wish to be limited by this method of preparation inasmuch as other acids may be prepared free of contaminating ions. Thus silicomolybdic acid may be prepared by commingling purified silica gel or a silica sol, molybdenum trioxide and nitric acid and heating these materials to comparatively high temperatures such as about 100° C. to about 200° C. under sufficient pressure to maintain the reacting solution in the liquid state. Further, I have found that the presence of the fluoride ion either as hydrogen fluoride or as the fluoride of the metal to be reacted has the effect of accelerating or catalyzing the formation of many of the heteropoly acids.

The following examples will serve to illustrate the preparation of catalysts according to my invention by impregnation of the carrier material with the purified heteropoly acid or salt or with an impure heteropoly acid or salt, the latter group being preferably employed only when the impurities are not detrimental or may be removed from the catalyst by simple heat treatment.

EXAMPLE I

A catalyst comprising approximately 9.8% by weight of silicomolybdic acid distended on bauxite was prepared by impregnating bauxite with a water solution of the purified silicomolybdic acid as follows: 100 parts of sodium molybdate was dissolved in 400 parts of water and heated to 60° C. after which 40 parts of concentrated hydrochloric acid was added. While rapidly stirring this solution a solution of 10 parts of 40 Baumé sodium silicate in 100 parts of $H_2O$ was slowly added. While stirring was continued 120 parts of concentrated hydrochloric acid was added. The resultant mixture was filtered and allowed to stand for 16 hours after which it was decanted from the solids and extracted with ether yielding 53 parts of an ether complex of the silicomolybdic acid. To further purify the complex it was mixed with 50 parts of water and 15 parts of nitric acid and enough ether to separate the third phase. Approximately 70 parts of water was added to the complex after centrifuging and separation from the above mixture and the ether was removed therefrom by warming and at the same time bubbling an air stream through the mixture.

A sample of 8 to 20 mesh bauxite was calcined for two hours at 600° C. 266 parts of this calcined bauxite was immersed in a solution of 173 parts of the silicomolybdic acid prepared above, diluted to 300 parts with water. The carrier was immersed in this solution for a period of 45 minutes and subsequently dried at a temperature of about 180° F. for 16 hours and was activated by heat treatment for two hours at 600° C. to yield a catalyst of the above composition.

EXAMPLE II

Another catalyst was prepared comprising approximately 8.5 per cent of phosphomolybdic acid distended on bauxite as follows: Phosphomolybdic acid was prepared by heating to a temperature of about 90° C. for about one hour, a mixture comprising 28 parts of sublimed molybdenum trioxide, 6 parts of 85% phosphoric acid, 2 parts of concentrated nitric acid and 200 parts of water. The resultant mixture was cooled and extracted with ether to yield the ether complex of the phosphomolybdic acid. The ether complex was mixed with an equal volume of water and the ether removed by bubbling air through the mixture under vacuum to yield the concentrated water solution of the phosphomolybdic acid. Approximately 306 parts of this concentrated phosphomolybdic acid solution was diluted to 500 parts with distilled water and 480 parts of 8 to 20 mesh bauxite as used in the above Example I, which had been calcined for two hours at 600° C., was immersed in this solution. After a 45 minute immersion the impregnated bauxite was removed from the solution, dried for 16 hours at 200° F. and activated for two hours at 600° C. to give a catalyst of the above composition.

EXAMPLE III

A catalyst comprising approximately 9% of titanomolybdic acid distended on a synthetic gel type alumina was prepared in the following manner: Approximately 5 parts of freshly prepared titania gel was slurried with 200 parts of water and 14 parts of sodium fluoride and heated to boiling. 70 parts of molybdic acid were added together with 10 parts of sodium fluoride in the presence of 100 parts of water and 100 parts of hydrochloric acid. The reaction solution was extracted with ether to yield the ether complex of the titanomolybdic acid. The acid was isolated as a water solution from the ether complex and employed to prepare the catalyst in the same manner as shown in Examples I and II above.

It is also possible to prepare catalysts of this type without the necessity of going through the somewhat tedious and expensive acid purification step. Such preparation is illustrated by the following examples in which only a few of the many possible catalysts are shown.

EXAMPLE IV

A catalyst comprising approximately 11.1% by weight of zinc phosphomolybdate distended on a synthetic highly purified alumina gel was prepared as follows: 500 parts of molybdenum trioxide, 140 parts of phosphoric acid, 35 parts of nitric acid and 2,000 parts of water were mixed and heated for approximately one-half hour at 90° C. to yield crude phosphomolybdic acid. After separation of the solution from the unreacted molybdenum trioxide the acid was isolated by ether extraction and to 75 parts of the acid in 450 parts of water 42 parts of zinc nitrate hexahydrate was added to form the zinc phosphomolybdate in acid solution. Approximately 410 parts of the synthetic alumina gel which had been previously calcined for two hours at 600° C., was immersed in the zinc phosphomolybdate solution for a period of 85 minutes. The impregnated alumina was removed from the impregnated solution, dried for 16 hours at 100° C. and activated by heating for two hours at 600° C. to give the catalyst of the above composition. I have found that the presence of excess phosphate and nitrate in the impregnating solution has substantially no deleterious effect on the finished catalyst of this type. Other catalysts were made by a process similar to the above comprising cobalt phosphomolybdate on a synthetic alumina carrier, cobalt phosphotungstate on an alumina carrier and aluminum phosphomolybdate on the same carrier.

A catalyst comprising phosphomolybdic acid on bauxite was prepared by impregnating the bauxite with the reaction products of molybdenum trioxide, phosphoric acid, nitric acid and water without extraction of the phosphomolybdic acid from the reaction product. Again it was found that the presence of the excess phosphoric and nitric acid had substantially no effect on the finished catalyst. Other catalysts such as beryllium and thorium phosphomolybdate distended on bauxite, were prepared by the addition of the corresponding metallic nitrate to a portion of the above reaction solution containing the phosphomolybdic acid with subsequent impregnation of bauxite with each of these metal phosphomolybdate solutions. As previously described if an excess of the metallic nitrate is employed the unreacted phosphate ion will be removed from the solution as an insoluble metal phosphate resulting in a purer heteropoly acid salt solution.

In another method of preparing the catalysts according to my invention simple mechanical mixing of the desired catalytic agent and the carrier may be employed. This procedure may be accomplished by either isolating the heteropoly acid or its salt in the dry state and subsequently mixing the dried acid or salt with the desired quantity of alumina, silica, titania, zirconia, magnesia, zinc oxide, thoria, mixtures of these, or the like, pilling or otherwise forming the catalyst particles and calcining at a relatively high temperature such as in the range of about 300° C. to about 800° C. to yield the desired catalyst. Alternatively a calculated amount of a solution of the heteropoly acid or of the salt thereof may be mixed with a carrier so as to result in a paste substantially free of excess solution which paste may be formed in any desired shape prior to or after drying and activation. This latter method differs somewhat from the method of impregnation as described above in that there is no excess solution and no question of separation of the carrier from the excess catalytic agent.

In yet another method of preparation of these catalysts an organic complex of the heteropoly acids may be prepared to effect the purification of the acid or salt and this complex used directly to impregnate, or otherwise combine with, the desired carrier whereafter the carrier is heated in the presence of air to a temperature sufficiently high to burn off the organic complex forming compound thus leaving the uncombined heteropoly acid or salt on the carrier. As organic compounds for the formation of these complexes I may use any nitrogen, sulfur or oxygen containing organic compound which is capable of forming a complex with the heteropoly acids, but I have found that the nitrogen or amine type compounds of the structural formula R—$NH_2$ are superior for this purpose inasmuch as their usage results in a more efficient extraction of the acid or salt from the reaction solution. Thus, in the preparation of a catalyst comprising for example, chromotungstic acid, the crude reaction products containing the chromotungstic acid as well as contaminating ions may be extracted with pyridine, whereby the pyridine complex of the acid separates as a solid phase from the reaction products and may be separated therefrom and employed directly to combine with a carrier selected from the class described above. The catalyst is then subsequently heated to the temperature in the range of approximately 300° C. to about 800° C. for a period of time ranging from about one hour to about six hours to effect the decomposition of the pyridine-chromotungstic acid complex and the removal of the organic constituents from the catalyst by oxidation at these temperatures.

In a fourth method of preparing a finished catalyst employing catalytic agents of the present invention, I may form an inorganic decomposable salt of the desired heteropoly acid as a means of extracting the acid from the reaction solution and employ a solution of this inorganic salt directly as the impregnating solution or combine the solid salt with the carrier and subsequently calcine the impregnated carrier at a temperature sufficiently high to decompose the salt and leave the heteropoly acid distended on the carrier. Thus in my method of preparing a phosphomolybdic acid containing catalyst I may separate the acid from the reaction products by addition of ammonium nitrate, chloride or the like to the reaction solution to form ammonium phosphomolybdate salt which is then removed as an insoluble precipitate from the solution, dissolved in acid and the resultant solution employed directly to impregnate the desired carrier. Alternatively the ammonium phosphomolybdate may be mixed with a carrier in dry form and the mixture pilled or otherwise formed and heat treated to decompose the ammonium salt to the heteropoly acid. Such usage of the inorganic salts of the heteropoly acid is particularly desirable in the formation of ammonium salts of certain of the heteropoly acids which are difficult to prepare as the acid and in those cases wherein the carrier contains a contaminating ion which is objectionable in the finished catalyst. A substitution may occur within the catalyst wherein the undesirable contaminating ion may replace the ammonia thus forming a metal heteropoly acid salt. Thus by employing either a solution or a dry powder of the ammonium salt of the desired heteropoly acid in the impregnation of the carrier the decomposition of the ammonium salt upon heat treating at a temperature in the range of 300° C. to 800° C. may result in the formation of the corresponding heteropoly acid salt of such contaminating metal ions as sodium, calcium, magnesium, or the like. As pointed out above the formation of such a salt with these contaminating ions has the effect of minimizing their deleterious effect on the destructability of the carrier. Possibly the greatest benefit from this method of preparation is the formation of a cheap pilled catalyst.

Although I have described numerous methods of preparing the catalyst according to the present invention I do not wish to be limited thereby inasmuch as the invention is directed primarily to the new and improved catalyst and secondarily to preparation methods and therefore other methods of preparation which may occur to those skilled in the art should not be construed as falling outside the principles of the present invention.

The carriers to be employed in the preparation of these catalysts will of necessity vary with the particular catalyst to be prepared. In most preparation procedures these carrier materials are pretreated in some manner such as by calcination at elevated temperatures, acid treatment, or the like to improve their characteristics in the final catalyst with relation to such factors as surface area, degree of purity and the like. It is within the scope of the present invention to employ any desired method of pretreating the selected carrier, but best results appear to be obtained when the carrier is at some time prior to the completion of the catalyst calcined at a temperature in the range of about 300° C. to about 800° C. and preferably in the range of about 500° C. to about 700° C. The stage at which this calcination is most effective is dependent upon the method of catalyst preparation employed. If the catalytic agent is to be distended on the carrier by means of impregnation from a solution containing the catalytic agent, it is desirable to calcine the carrier at a temperature in the above range prior to the impregnation, but on the other hand, if the catalyst is to be prepared by mixing the catalytic agent with the carrier, the latter being either dry or in gelatinous form the calcination is most effective after the mixture has been made. Although such calcinations represent the preferred procedure in making these catalysts, other methods may be employed which may always yield effective catalysts containing the components as disclosed herein. Similarly there are many ways of treating a catalyst prior to usage to increase its activity, heat stability, mechanical strength or the like all of which may be employed within the scope of the present invention. Thus the catalysts as disclosed may be in powder form, granules, pills or any desired shape. The forming of the catalyst may be accomplished prior to or subsequent to the combination of the catalytic agent with the carrier. In general it is preferred, in those cases where the catalytic agent is combined with the carrier by means of impregnation of the carrier from an aqueous or other solution of the catalytic agent, to form the carrier into the desired shape prior to this impregnation. Conversely if the catalytic agent and carrier are to be combined by mechanical mixing it is preferable to form the catalyst after the combination has been effected. Also in most cases I have found that best catalytic results are obtained if the combined carrier and catalytic agent, i. e., the catalyst is heated to a temperature in the range between about 300° C. and about 800° C. for a period of from about 1 to about 4 hours. The preferred temperatures for this heat treatment lie between about 400° C. and about 650° C. and the optimum time of treatment has been found to be about 2 hours. It is to be emphasized that these considerations are not to be construed as establishing limitations of the present invention inasmuch as any method of treating the catalyst may be employed dependent upon the choice of the individual uses.

In many catalytic reactions a catalyst is employed which may be said to be comprised substantially completely of the catalytic agent in the absence of any carrier or supporting material. Such usage is illustrated for example in the desulfurization of sulfur containing hydrocarbons wherein a mixture of the combined oxides of cobalt and molybdenum has been employed in the absence of supporting alumina or other carriers. Such catalysts may also be prepared and used according to the present invention by calcining the acids or salts as herein disclosed in the absence of carrier material. I have found that such application is more effective with the metal salts of the heteropoly acids than with the acids themselves and particularly those metal salts in which the salt forming metal ion is selected from the class of elements comprising alumina, zirconia, titania, magnesia, cobalt oxide, thoria, or the like are the most satisfactory. Thus such catalysts as cobalt phosphomolybdate, cobalt phosphovanadate, cobalt silicotungstate, and the like are effective desulfurization catalysts while such catalysts as aluminum boromolybdate, aluminum phosphomolybdate, titanium phosphomolybdate, ferric silicomolybdate, and the like are effective hydroforming catalysts, etc.

The foregoing description illustrates the type of catalysts and methods of preparing these catalysts which I may employ to catalyze high temperature hydrocarbon conversion processes such as the "hydrogen exchange processes" including dehydrogenation, desulfurization, hydrogenation, hydroforming, aromatization, and the like, "molecular reforming processes" such as cracking, alkylation, desulfurization, condensation, and the like, "addition processes" such as nitration, chlorination, bromination, hydration, and the like, and "isomerization processes," which conversion processes are generally carried out at temperatures in the range of about 50° F. and to about 1500° F. and at pressures in the range of about −14 pounds per square inch to as high as 1,000 pounds per square inch or higher. For these processes, I may employ catalysts comprising a catalytic agent consisting of the heteropoly acid or a salt of the heteropoly acid which catalytic agent may or may not be distended on a suitable carrier. The preferred catalysts according to the present invention comprise the heteropoly acids or the salts of the heteropoly acids, and preferably those acids or salts containing phosphorus as the central ion, as the catalytic agents distended on alumina of either natural or synthetic origin.

Thus in the process known as "hydroforming" a selected hydrocarbon feed is subjected to the action of the catalyst at temperatures in the range of about 700° F. to about 1200° F., and preferably in the range of about 850° F. to about 1050° F., and at pressures of about 100 to about 500 pounds per square inch or higher in the presence of a hydrogen rich recycle gas whereby a substantial portion of the hydrocarbon feed is converted to aromatic hydrocarbons. Also in a hydrocarbon conversion process known as "desulfurization" sulfur containing hydrocarbons are passed over the catalyst at temperatures ranging from as low as about 500° F. to as high as about 1,000° F. but preferably in the range of about 600° F. to about 900° F. and at pressures in the range of a few atmospheres to about 1,000 pounds per square inch or higher. The desulfurization is more complete if the reaction is carried out in the presence of a hydrogen rich recycle gas.

The dehydrogenation of the normally gaseous hydrocarbons as well as the normally liquid hydrocarbons in the presence of catalysts of the present invention may be carried out at temperatures in the range of about 900° F. to about 1500° F. and preferably in the range of about 1,000° F. to about 1,200° F. at pressures in the range of −14 pounds per square inch to atmospheric or above. In the dehydrogenation of certain hydrocarbons particularly those containing an unsaturated linkage it may be desirable to include in the feed to the reaction an inert diluent such as steam, nitrogen, carbon dioxide or the like, or a gas which may function as a "hydrogen exceptor" such as a lower molecular weight olefin, diolefin, or the like.

In certain of its aspects the process of aromatization is analogous to the process of dehydrogenation and hydroforming, and for this reason the preferred catalysts for the aromatization reaction are those in which the catalytic agent comprises a heteropoly acid or a heteropoly acid salt containing both chromium and molybdenum such as for example chromium phosphomolybdate, chromiomolybdic acid, chromium germanomolybdate, chromium arsenomolybdate, beryllium chromiomolybdate, and the like. In the process of aromatization the hydrocarbon feed, normally substantially paraffinic in nature, is passed over the catalyst at a temperature in the range of about 600° F. to about 1,000° F. and preferably in the range of about 700° F. to about 900° F. at pressures in the range of about atmospheric to 100 pounds per square inch or greater. The aromatization reaction may be carried out either in the presence or absence of a hydrogen rich recycle gas.

The following examples represent the utilization of only a few of the catalysts prepared according to the present invention, but are illustrative of the merits of these catalysts.

EXAMPLE V

Two hydroforming catalysts were prepared using a low iron content bauxite as a carrier upon which was distended in one case 10.0 weight per cent of molybdenum trioxide and in the other 8.4 weight per cent of phosphomolybdic acid. Catalyst No. 1 comprising the molybdenum trioxide distended on bauxite was prepared by immersing 250 parts by weight of low iron content bauxite of 8-20 mesh size in 250 parts of impregnating solution. This impregnating solution was prepared by dissolving 65 parts of ammonium paramolybdate (analyzing 81.8% $MoO_3$) in 125 parts of 0.9 specific gravity ammonium hydroxide. Fifty parts of water were added to the ammonium hydroxide solution, the resultant solution filtered and diluted with water to yield 250 parts of the impregnating solution. After 15 minutes' immersion time the impregnated bauxite was removed from the solution, dried for 16 hours at approximately 110° C. and heated for two hours in an atmosphere of air at 600° C. to convert the adsorbed ammonium molybdate to molybdenum trioxide. The finished catalyst designated as "catalyst No. 1" analyzed 10.0 weight per cent of $MoO_3$ on the bauxite carrier. Catalyst No. 2 was prepared by immersing a sample of the same bauxite in an aqueous solution of phosphomolybdic acid as follows: The phosphomolybdic acid was prepared by heating a mixture comprising 600 parts by weight of sublimed molybdenum trioxide, 110 parts of orthophosphoric acid, 100 parts of concentrated nitric acid and 1,000 parts of water to 65-85° C. for three hours accompanied by continual agitation. The supernatant liquid was decanted from the unreacted $MoO_3$, filtered and extracted with ether to yield approximately 410 parts by weight of the ether complex of the acid. This complex was dissolved in an equal volume of water and the ether was removed by bubbling air through the solution under vacuum. The resulting concentrate was diluted with water to the ratio of 243 parts of phosphomolybdic acid to 250 parts of water and the catalyst was prepared by immersing 500 parts of 8-20 mesh, low iron bauxite in 555 parts of this solution for 2½ hours, drained, dried for 16 hours at 110° C. and heated for two hours to 600° C. The finished catalyst contained 8.4 per cent by weight of phosphomolybdic acid.

Catalysts 1 and 2 were tested for hydroforming activity when fresh and after a heat treatment for six hours at 800° C. by passing a feed comprising a 200° F. to 260° F. boiling range naphtha fraction over each catalyst sample at 950° F., isothermal block temperature, 100 pounds per square inch gage pressure, at a liquid hourly space velocity of 1.0 and with 3,000 cubic feet of hydrogen rich recycle gas per barrel of feed. The aromatic synthesis reported in Table 1 was taken in each case as a measure of the hydroforming activity of each catalyst.

*Table 1*

|  | Catalyst No. 1 | | Catalyst No. 2 | |
|---|---|---|---|---|
| $MoO_3$, weight per cent | 10.0 | | [1] 8.0 | |
| Heat Treatment Temp., °C | Fresh | 800 | Fresh | 800 |
| Test Data: | | | | |
| Product Yield, volume per cent | 68.6 | 83.7 | 77.2 | 77.8 |
| Product gravity, °A. P. I. | 42.0 | 50.3 | 43.2 | 45.0 |
| Synthetic Aromatics, volume per cent | 34.3 | 19.6 | 35.0 | 31.9 |

[1] Present as phosphomolybdic acid.

From these data it is apparent that, although the molybdenum content of catalyst No. 2 is below that of catalyst No. 1, the activities of the fresh catalysts agree within experimental error. Further the heat stability of catalyst No. 2 is considerably better than that of catalyst No. 1, the former losing approximately 12% of its fresh activity as compared to a loss of approximately 43% suffered by the latter. As previously described the improvement of heat stability is attributed to the use of the molybdenum in combined form whereby it may be considered to be less available to accelerate the loss in activity of the carrier. Yet another advantage of the catalysts of the present invention is evidenced by the data of Table 1, that being the reduction of the cracking characteristics of the catalyst. This effect is apparent by comparison of the 68.6% liquid yield from catalyst No. 1 and the 77.2% liquid yield from catalyst No. 2 at substantially the same level of hydroforming activity.

EXAMPLE VI

A third hydroforming catalyst comprising silicomolybdic acid distended on low iron content bauxite was prepared as follows: 300 parts of sodium molybdate was dissolved into 1200 parts of water to which solution was added 120 parts of concentrated hydrochloric acid. This solution was vigorously stirred and 30 parts of 40 Baumé sodium silicate dissolved in 300 parts of water was slowly added. Subsequent to this addition 360 parts of concentrated hydrochloric acid was added to the mixture. The resultant solution was extracted with ether to give the ether acid complex. The ether complex containing sodium ion as an impurity was washed twice with a solution of 3 to 1 dilution of concentrated nitric acid. An equal volume of water was added to the purified extract and the ether removed by bubbling air through the mixture under vacuum. A catalyst was prepared by immersing 500 parts of the 8 to 20 mesh low iron bauxite employed in the preparation of catalysts 1 and 2 in a solution comprising 267 parts of a silicomolybdic acid-water concentrate diluted to 555 parts with water. After an immersion time of 2½ hours the impregnated bauxite was drained and dried for 16 hours at 100° C. and subsequently heat treated for two hours at 600° C. The resultant catalyst designated catalyst No. 3 comprised approximately 8% by weight of silicomolybdic acid distended on the 8 to 20 mesh bauxite. This catalyst was tested for hydroforming activity according to the procedure outlined in Example V when fresh and after a six hour heat treatment at 800° C. The results of these activation tests are given in Table 2 in which the activity data for catalyst No. 1 is repeated for purposes of comparison.

*Table 2*

|  | Catalyst No. 1 | | Catalyst No. 3 | |
|---|---|---|---|---|
| $MoO_3$, weight per cent | 10.0 | | [1] 8.0 | |
| Heat Treatment Temp., °C | Fresh | 800 | Fresh | 800 |
| Test Data: | | | | |
| Product Yield, volume per cent | 68.6 | 83.7 | 68.4 | 77.2 |
| Product Gravity, °A. P. I. | 42.0 | 50.3 | 41.6 | 44.6 |
| Synthetic Aromatics, volume per cent | 34.3 | 19.6 | 35.1 | 34.2 |

[1] Present as silicomolybdic acid.

It is seen from these data that the combination of the molybdenum with the silica in the form of silicomolybdic acid greatly improves the heat stability of the catalyst as evidenced by a loss of activity of the silicomolybdic acid catalyst of some 2% and of the molybdenum trioxide catalyst of 43%. Further, by comparison of the data for catalyst No. 3 and the data for catalyst No. 2 the latter containing phosphomolybdic acid, it is apparent from the yield values and products gravities that the presence of the silica induces a destruction of the feed greater than that of the phosphorus containing heteropoly molybdic acid. However, this destruction due to the presence of silica is not substantially different from that occurring when employing molybdenum trioxide as the catalytic agent as evidenced by the gravities and the yields shown for the fresh catalyst No. 1.

EXAMPLE VII

Another effective hydroforming catalyst utilizes the aluminum salt of the phosphomolybdic acid as the catalyst agent. To prepare such a catalyst 32 parts of aluminum nitrate

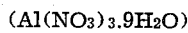

was dissolved in a solution of 224 parts of phosphomolybdic acid concentrate diluted to a total of 555 parts with water. 555 parts of the same 8 to 20 mesh low iron bauxite was immersed in this solution for 110 minutes, subsequently drained, dried, for 16 hours at approximately 100° C. and heat treated for two hours at 600° C. This catalyst was tested for hydroforming activity as in the above example yielding a synthesis of aromatics of approximately 34% when fresh and approximately 33.1% after heat treatment at 800° C. for six hours. It was found that the activity and heat stability of this catalyst which comprised approximately 9.0% of aluminum phosphomolybdate distended on the low iron bauxite, is substantially equal to the heat stability and activity of the phosphomolybdic acid and silicomolybdic acid catalysts.

EXAMPLE VIII

Two desulfurization catalysts were prepared, one comprising the combined oxides of cobalt and molybdena distended on a gel type alumina, and the other cobalt phosphomolybdate distended on the same aluminum. Catalyst No. 4 comprising the combined oxides of cobalt and molybdena distended on alumina was prepared by impregnation of the alumina carrier with a solution containing salts of cobalt and molybdenum. This impregnation solution was prepared as follows: 173 parts by weight of ammonium paramolybdate containing 82.2% of molybdenum trioxide was dissolved in a solution of 450 parts by weight of .9 specific gravity ammonium hydroxide and 300 parts of water. To this ammonium molybdate in ammoniacal solution was added 150 parts by weight of a 3.43 molar cobalt nitrate solution. The catalyst was prepared by immersing 300 parts of 8 to 20 mesh synthetic alumina gel, which had been previously heat treated for two hours at 600° C., in 400 parts of the above impregnating solution. After fifteen minutes' immersion the impregnated alumina granules were drained, dried for sixteen hours at approximately 110° C. and heat treated for two hours at 600° C. to yield the final catalyst comprising approximately 9.7% of the combined oxides of cobalt and molybdenum and approximately 90.3% by weight of alumina.

Catalyst No. 5 comprising approximately 9% of cobalt phosphomolybdate of the same synthetic gel type alumina was prepared as follows: 364 parts of a concentrated phosphomolybdic acid solution was mixed with 59 parts of cobalt nitrate hexahydrate and this mixture diluted with water to give a total of 700 parts by weight. 575 parts of the 8 to 20 mesh alumina previously heat treated for two hours at 600° C. was immersed in the solution of cobalt phosphomolybdate for 45 minutes. The impregnated alumina was drained, dried for approximately 16 hours at 100° C. and heat treated for two hours at 600° C.

Each of these catalysts was employed to desulfurize a heavy straight run gas oil with a boiling range of approximately 395° F. to 650° F. and containing 2.28 weight per cent of sulfur determined by the ASTM bomb method. A six hour run was made with a sample of each catalyst as prepared and after an 800° C., six hour heat treatment. The conditions of operation were a liquid hourly space velocity of 2, a pressure of 150 pounds per square inch gage, 750° F. isothermal block temperature and with 3,000 cubic feet of a hydrogen rich recycle gas per barrel of feed. It is realized that these conditions of operation are not optimum for gas-oil desulfurization inasmuch as an increase in pressure or a reduction in space velocity will affect a greater degree of sulfur removal but were arbitrarily chosen for standard test conditions. The results of these activated tests are tabulated in Table 3 below:

Table 3

|  | Catalyst No. 4 | | Catalyst No. 5 | |
|---|---|---|---|---|
| CoO—MoO₃, weight per cent | 9.7 | | ¹ 9.0 | |
| Heat treatment, ° C | Fresh | 800 | Fresh | 800 |
| S in product, weight per cent | .21 | .31 | .20 | .22 |

¹ Present as cobalt phosphomolybdate.

EXAMPLE IX

Another desulfurization catalyst was prepared in a manner similar to that of catalyst No. 4 comprising approximately 7.9% by weight of the combined oxides of cobalt and molybdenum distended on 8 to 20 mesh low iron content bauxite and is designated catalyst No. 6. Catalyst No. 7 comprising approximately 8% by weight of ferric phosphomolybdate distended on the same bauxite was prepared as follows: 206 parts of phosphomolybdic acid concentrate, 30 parts of concentrated nitric acid and 61 parts of ferric nitrate (Fe(NO₃)₃.9H₂O) were dissolved and diluted to 480 parts with water. 500 parts of the 8 to 20 mesh bauxite was immersed in this solution of ferric phosphomolybdate for 60 minutes. The impregnated bauxite was drained, dried for 16 hours at 110° C. and heat treated for two hours at 600° C. Each of these catalysts was tested for desulfurization activity as in Example VII when fresh and after heat treatment at 800° C. for six hours. The results of these tests are given in Table 4 below:

Table 4

|  | Catalyst No. 6 | | Catalyst No. 7 | |
|---|---|---|---|---|
| Catalytic agent, weight per cent | ¹ 7.9 | | ² 8.0 | |
| Heat treatment, ° C | Fresh | 800 | Fresh | 800 |
| S in product, weight per cent | .182 | .270 | .190 | .203 |

¹ Present as cobalt molybdate.
² Present as ferric phosphomolybate.

It is apparent from Examples VII and VIII that the catalysts of the present invention in which the cobalt and molybdenum or iron and molybdenum are present on the catalyst in the form of a heteropoly salt yield a catalyst of greater heat stability than when the catalytic agent consists simply of the combined oxides of the metals.

It is to be understood that these examples are not intended to limit my invention inasmuch as other catalysts have been prepared and used in these and other hydrocarbon conversion processes and the present invention includes the usage and preparation of catalysts comprising a heteropoly acid or a heteropoly acid salt either distended on a suitable carrier or in itself for catalysts for the hydrocarbon conversion process.

Having described and illustrated the principles of my invention and realizing that many modifications thereof may occur to those skilled in the art without departing from the spirit and scope of the invention, I claim:

1. A process for the catalytic conversion of hydrocarbons which comprises subjecting such hydrocarbons to temperatures in the range of about 800° F. to about 1,500° F. under gage pressures of about −14 pounds to about 1,500 pounds per square inch in the presence of a catalyst consisting essentially of a major proportion of an inorganic metal oxide carrier and impregnated thereon a minor proportion between about 3% and about 20% of a catalytic agent selected from the class of compounds consisting of the heteropoly acids and the metal salts of the heteropoly acids.

2. A hydrogen exchange process for the treatment of hydrocarbons which comprises subjecting such hydrocarbons to temperatures in the range of about 800° F. to about 1,500° F. under gage pressures of about −14 pounds to about 1,500 pounds per square inch in the presence of a catalyst consisting essentially of a major proportion of an inorganic metal oxide carrier and impregnated thereon a minor proportion between about 3% and about 20% of a catalytic agent selected from the class of compounds consisting of the heteropoly acids and the metal salts of the heteropoly acids.

3. A process for the catalytic conversion of hydrocarbons which comprises subjecting said hydrocarbons to a temperature between about 800° F. and about 1500° F. in the presence of a catalyst consisting essentially of a major proportion of an inorganic metal oxide carrier and impregnated thereon a minor proportion between about 3% and about 20% of cobalt silicomolybdate.

4. A process for the catalytic conversion of hydrocarbons which comprises subjecting said hydrocarbons to a temperature between about 800° F. and about 1500° F. in the presence of a catalyst consisting essentially of a major proportion of an inorganic metal oxide carrier and a minor proportion between about 3% and about 20% of a catalytic agent, said catalyst having been prepared by commingling an excess of molybdenum trioxide with an aqueous solution containing phosphoric acid, heating the mixture to a temperature greater than about 60° C. for a time sufficient to dissolve the bulk of the molybdenum trioxide with the formation of phosphomolybdic acid, immersing said carrier in the resultant solution so as to impregnate the carrier with said solution, and drying the impregnated carrier.

5. A process for the catalytic conversion of hydrocarbons which comprises subjecting said hydrocarbons to a temperature between about 800° F. and about 1500° F. in the presence of a catalyst consisting essentially of a major proportion of an inorganic metal oxide carrier and a minor proportion between about 3% and about 20% of a catalytic agent, said catalysts having been prepared by commingling molybdenum trioxide, silica gel, nitric acid and water, heating the resultant mixture to a temperature greater than about 60° C. for a time sufficient to form silicomolybdic acid solution, immersing said carrier in said solution so as to impregnate said solution thereon, separating and drying the impregnated carrier.

6. A process according to claim 5 in which a salt of a different polyvalent metal is dissolved in the aqueous solution prior to the impregnation of the carrier therewith.

7. A process according to claim 6 in which a salt of a different polyvalent metal is dissolved in the aqueous solution prior to the impregnation of the carrier therewith.

8. A process for the catalytic conversion of hydrocarbons which comprises subjecting said hydrocarbons to a temperature between about 800° F. and about 1500° F. in the presence of a catalyst consisting essentially of a major proportion of an inorganic metal oxide carrier and a minor proportion between about 3% and 20% of a catalytic agent, said catalyst having been prepared by dissolving sodium molybdate in water, adding phosphoric acid, acidifying said solution, heating the resulting mixture to a temperature greater than about 60° C. for a period sufficient to form phosphomolybdic acid solution, purifying said solution by removal of sodium ions therefrom, impregnating said carrier with said purified solution, and separating and drying the impregnated carrier.

9. A process for the catalytic conversion of hydrocarbons which comprises subjecting said hydrocarbons to a temperature between about 800° F. and about 1500° F. in the presence of a catalyst consisting essentially of a major proportion of an inorganic metal oxide carrier and a minor proportion between about 3% and about 20% of a catalytic agent, said catalyst having been prepared by dissolving sodium molybdate and sodium silicate in water, acidifying with nitric acid, heating the resultant mixture to a temperature greater than about 60° C. for a period sufficient to form silicomolybdic acid solution, purifying said solution by removal of sodium ions therefrom, impregnating said carrier with the purified solution, and separating and drying the impregnated carrier.

10. A process for the catalytic conversion of hydrocarbons which comprises subjecting said hydrocarbons to a temperature between about 800° F. and about 1500° F. in the presence of a catalyst consisting essentially of a major proportion of an inorganic metal oxide carrier and a minor proportion between about 3% and about 20% of a catalytic agent, said catalyst having been prepared by dissolving sodium molybdate in water, adding an aqueous solution containing phosphoric acid, heating the resultant mixture to a temperature greater than about 60° C. for a time sufficient to form phosphomolybdic acid, adding sufficient ether to form a resulting mixture containing at least two phases, one of which is an aqueous phase containing sodium salts, and the other of which is an ether phase containing dissolved phosphomolybdic acid-ether complex, separating the latter phase, adding water thereto and boiling the ether therefrom to obtain an aqueous impregnation solution containing purified phosphomolybdic acid, impregnating said solution on said carrier, and separating and drying the impregnated carrier.

11. A process for the catalytic conversion of hydrocarbons which comprises subjecting said hydrocarbons to a temperature between about 800° F. and about 1500° F. in the presence of a catalyst consisting essentially of a major proportion of an inorganic metal oxide carrier and a minor proportion between about 3% and about 20% of a catalytic agent, said catalyst having been prepared by commingling sodium silicate, molybdenum trioxide, nitric acid, and water, heating the resultant mixture to a temperature greater than about 60° C. for a time sufficient to form silicomolybdic acid solution, adding sufficient ether to said solution to form a mixture containing an aqueous phase containing sodium salts, and an ether phase containing silicomolybdic acid-ether complex, separating the latter phase, adding water thereto and boiling off the ether to obtain an aqueous impregnation solution containing silicomolybdic acid, impregnating said carrier with said solution, separating and drying the impregnated carrier.

12. A process for the catalytic conversion of hydrocarbons which comprises subjecting said hydrocarbons to a temperature between about 800° F. and about 1500° F. in the presence of a catalyst consisting essentially of a major proportion of an inorganic metal oxide carrier and impregnated thereon a minor proportion between about 3% and 20% of a heteropoly acid as a catalytic agent.

13. A process according to claim 12 in which the heteropoly acid is one in which phosphorus is the central atom.

14. A process for the catalytic hydroforming of hydrocarbons which comprises subjecting said hydrocarbons to a temperature between about 800° F. and 1200° F. in the presence of a hydrogen and a catalyst consisting essentially of a major proportion of alumina and impregnated thereon a minor proportion between about 3% and about 20% of a molybdenum-containing heteropoly acid.

15. A process according to claim 14 in which the heteropoly acid is one in which phosphorus is the central atom.

16. A process for the catalytic conversion of hydrocarbons which comprises subjecting said hydrocarbons to a temperature between about 800° F. and about 1500° F. in the presence of a catalyst consisting essentially of a major proportion of an inorganic metal oxide carrier and impregnated thereon a minor proportion between about 3% and about 20% of a metal salt of a heteropoly acid.

17. A process according to claim 16 in which the catalytic agent is a metal salt of a heteropoly acid in which the central atom is phosphorus.

18. A process for the catalytic hydroforming of hydrocarbons which comprises subjecting said hydrocarbons to a temperature between about 800° F. and about 1200° F. in the presence of hydrogen and a catalyst consisting essentially of a major proportion of alumina and impregnated thereon a minor proportion between about 3% and about 20% of a metal salt of a molybdenum containing heteropoly acid.

19. A process according to claim 18 in which the metal salt is a chromium salt.

20. A process for the catalytic desulfurization of hydrocarbon mixtures which comprises subjecting said mixtures to a temperature between about 500° F. and 1000° F. at a superatmospheric pressure not greater than about 1000 pounds per square inch in the presence of hydrogen and a catalyst consisting essentially of a major proportion of alumina and a minor proportion between about 3% and about 20% of cobalt phosphomolybdate.

21. A process for the catalytic hydroforming of hydrocarbons which comprises subjecting said hydrocarbons to a temperature between about 800° F. and about 1200° F. in the presence of hydrogen and a catalyst consisting essentially of a major proportion of alumina and impregnated thereon a minor proportion between about 3% and about 20% of a cobalt salt of a molybdenum containing heteropoly acid.

22. A process for the catalytic conversion of hydrocarbons which comprises subjecting said hydrocarbons to a temperature between about 800° F. and about 1500° F. in the presence of a catalyst consisting essentially of a major proportion of an inorganic metal oxide carrier and impregnated thereon a minor proportion between about 3% and about 20% of cobalt phosphomolybdate.

RAYMOND N. FLECK.

REFERENCES CITED

The following references are of record in the file of this patent:

UNITED STATES PATENTS

| Number | Name | Date |
|---|---|---|
| 1,698,009 | Weber | Jan. 8, 1929 |
| 2,002,997 | Herold et al. | May 28, 1935 |
| 2,058,789 | Herold et al. | Oct. 27, 1936 |
| 2,162,913 | Eversole et al. | June 20, 1939 |
| 2,173,187 | Tanner | Sept. 19, 1939 |
| 2,186,437 | Toussaint | Jan. 9, 1940 |
| 2,220,693 | Van Peski et al. | Nov. 5, 1940 |
| 2,231,446 | Grosse | Feb. 11, 1941 |
| 2,270,044 | Fulton et al. | Jan. 13, 1942 |
| 2,301,966 | Michael et al. | Nov. 17, 1942 |
| 2,316,260 | Lee et al. | Apr. 13, 1943 |
| 2,375,402 | Corson et al. | May 8, 1945 |
| 2,406,632 | Pines et al. | Aug. 27, 1946 |
| 2,420,477 | Hale et al. | May 13, 1947 |
| 2,425,096 | Ipatieff et al. | Aug. 5, 1947 |

OTHER REFERENCES

Kingman: Faraday Society Trans., June 1937, vol. 33 (pages 784 to 793).